United States Patent [19]

Gugenheimer et al.

[11] Patent Number: 5,759,085
[45] Date of Patent: Jun. 2, 1998

[54] PROCESS FOR AVOIDING OVERSTRESSING A WORKPIECE DURING GRINDING

[75] Inventors: Robert Gugenheimer, Immenstaad; Johannes Reilhofer; Werner Binsmaier, both of Karlsfeld, all of Germany

[73] Assignee: ZF Friedrichshafen AG, Friedrichshafen, Germany

[21] Appl. No.: 557,047

[22] PCT Filed: May 27, 1994

[86] PCT No.: PCT/EP94/01724

§ 371 Date: Feb. 8, 1996

§ 102(e) Date: Feb. 8, 1996

[87] PCT Pub. No.: WO94/27783

PCT Pub. Date: Dec. 8, 1994

[30] Foreign Application Priority Data

Jun. 1, 1993 [DE] Germany .................. 43 18 102.3

[51] Int. Cl.⁶ ...................................... B24B 49/00
[52] U.S. Cl. .......................... 451/8; 451/5; 451/9; 451/28; 451/403; 451/47

[58] Field of Search .................. 451/8, 7, 47, 53, 451/488, 9, 231, 130, 403, 10

[56] References Cited

U.S. PATENT DOCUMENTS

| 3,984,213 | 10/1976 | Kelso | 451/28 |
| 4,505,075 | 3/1985 | Salmon et al. | 451/9 |
| 4,744,179 | 5/1988 | Mockli | 451/47 |
| 5,111,562 | 5/1992 | Burka | 451/403 |
| 5,148,637 | 9/1992 | Byron | 451/5 |
| 5,174,068 | 12/1992 | Pickert | |
| 5,174,070 | 12/1992 | Losch et al. | |

*Primary Examiner*—Robert A. Rose
*Assistant Examiner*—George Nguyen
*Attorney, Agent, or Firm*—Davis and Bujold

[57] ABSTRACT

A process is proposed for recognizing thermal overstressing of a workpiece during grinding (overheating) by way of a grinding arrangement with a grinding spindle and a driving machine, the speed of rotation of the grinding spindle is measured, the measured value is supplied to a data processing device, a measure of the kinetic energy of the grinding spindle is derived therefrom and this measure is compared with a reference value characteristic of overheating.

16 Claims, 3 Drawing Sheets

PROCESS FOR AVOIDING OVERSTRESSING A WORKPIECE DURING GRINDING

The invention relates to a process for avoiding thermal overstressing in a workpiece during grinding.

BACKGROUND OF THE INVENTION

In the manufacture of qualitatively high-grade parts, such as gears or other workpieces having special profiles, it becomes increasingly important for obtaining a great precision and accuracy of shape to add a fine machining after the previous machining and hardening. Grinding is often used as fine machining process. Here is removed an overmeasure resulting, on one hand, from the machining prior to hardening and, on the other, from hardening distortions. In the hard machining of gears, the overmeasure mostly amounts to between one and three tenths of a millimeter.

By virtue of the removal of said overmeasure, the grinding operation must produce the final shape for which a partial difference of only a few micrometers are admissible. On the other hand, economic considerations require that the hard or fine machining be effected in the shortest possible time in order to obtain a maximum workpiece output per machine and per time unit.

These two contradictory requirements have led in the past to the development of more efficient grinding processes wherein diamonds and cubically crystalline boron nitride are used together with the conventional grinding materials (such as silicon carbide, electrocorundum).

In the practice, the fine machining operation is carried out with high specific rates of metal removal, that is, with a maximum number of cubic millimeters of overmeasure removed per second of grinding time and per millimeter of grinding wheel width. But the limit of optimation capacity is reached where the work is effected with such large feeds that the grinding wheel locally produces on the surface of contact with the workpiece temperatures so elevated that thermal structural changes appear in the workpieces. The expert here speaks of overheating and thereby means a thermal damage of the workpiece such that it becomes waste. Different causes can produce the overheating. The most frequent causes are:

a worn out grinding wheel;

a grinding wheel with added abrasion;

overmeasure errors and centering errors;

too great a feed;

errors in mounting the workpieces;

insufficient cooling.

Therefore, monitoring the overheating is an important criterion of quality for industrial production. For this purpose there are often used etching methods in which workpieces used as samples are etched in different baths in order to make visible therefrom any change occurred in the rim zones of the texture. But the process is costly and does not permit an examination of all workpieces. It can be used only after the machining and allows no inspection of the workpieces for overheating during the grinding operation.

German patent 40 25 552 has now disclosed a process and an apparatus for recognizing thermal overstressing of a workpiece. The increase in temperature on the surface subjected to grinding is here determined and said actual value is compared with a reference value. The reference value has been determined under the same parameters of the grinding operation with a grinding wheel which has led to generation of overheating on a reference workpiece. The grinding operation with the grinding wheel concerned is terminated as soon as determining an increase of temperature corresponding to the critical temperature producer of the overheating taking into consideration a presettable safety margin. Since determining the temperature on the workpiece to be processed has been admitted to be difficult and inaccurate, it has been proposed to make use, instead of the temperature increase produced by the grinding operation, a geometric change in shape of the workpiece conditioned thereby. But for this reference measurement, costly measuring devices must be applied to the workpieces to be machined which prevent a simple handling of the overheating detection and do not allow reliable measurement results. This process also offers only the possibility of recognizing overheating that has already been generated, that is, of detecting damage. Over-heating cannot be avoided thereby.

SUMMARY OF THE INVENTION

The invention is based on the problem of improving a process for avoiding thermal overstresses on workpieces during grinding according to the preamble of claim 1 in the sense of obtaining a reliable recognition of overheating.

In research it has been found that, independently of the quality of grinding whether cutting or abradant, all mechanical energy received is always converted to thermal energy. Almost all the energy supplied to the system by the machine tool spindle in the form of driving energy is converted to thermal energy in the grinding process and must be mechanized by the workpiece. The generated overheating takes effect as a conversion from too much mechanical energy to thermal energy per unit time and per machined surface.

The grinding of gears poses special difficulties. Here two tooth flanks belonging to two different adjoining teeth and forming a tooth gap between them are ground in one grinding operation.

For the individual tooth flank there is, depending on position, a maximum tolerable surface temperature and thus a maximum tolerable power loss. Therefore, the amount of converted energy has to be measured and evaluated for recognizing the overheating or a risk of overheating. Here has to be determined the distribution of energy of each two simultaneously ground tooth flanks of the adjoining teeth. Hereby the generation of thermal damages can be better recognized even with uneven distribution of overmeasure and the unevenness resulting therefrom during the temperature development on both tooth flanks to be ground.

The converted thermal energy is determined for both tooth flanks to be simultaneously machined. It must be found here how the introduced energy is distributed on both tooth flanks. What is important is not the volume of total energy introduced, but the maximum value which appears respectively on a tooth flank. If the measured thermal energy exceeds a preset threshold, it has to be concluded that overheating exists. If in a preset feed the measured energy still is clearly below the threshold, then the feed can be increased. If the feed is controlled in a manner such that the extent of risk remains always below the threshold, it is possible to move with greater feed under otherwise good conditions (good wheel, small overmeasure problems). The feed is oriented on the grinding wheel state and, at the same time, constantly does justice to the overmeasure.

According to the invention, the spindle speed is engaged to determine the energy spent. Therefrom can be found the energy of the driving unit.

By a constant online determination of the risk of overheating occurring, an optimation of the feed can be obtained which results in a reliable avoidance of overheating. Overheating occurs in the first place as a result of too high pressure in the gap and as a consequence of too much feed when roughening out relative to the actual grinding property of the wheel and to the actual overmeasure. The increased pressure produces a development of temperature beyond a critical threshold. By measurements it has resulted that toward the ground end of the gap a pressure increase and a greater risk of overheating appears. This phenomenon occurs particularly in the last quarter of the gap. This is to be attributed to accumulative effects in the temperature development during the grinding operation.

The energy which is converted to thermal energy in the tooth gap during the grinding operation is essentially determined by the overmeasure and the grinding force of the grinding wheel. The temperature, in turn, is determined by the energy spent per time and surface. The time is determined by the feed while the grinding surface is a constant parameter. The surface is not stable only when the pitch error, depending on how concentrically the grinding wheel is inserted in the tooth gap, is so great that one flank side remains partly or wholly unground. But then the other flank has a correspondingly great overmeasure. The pitch error results depending on how concentrically the grinding wheel is inserted in the tooth gap. The energy spent per time becomes apparent in the reduction of speed of the driving spindle and in the change of the spindle current. If the current of the dividing apparatus is now additionally measured, an evidence of the overmeasure distribution on both flanks just machine results. If a pitch error exists, then the energy is asymmetrically converted on the flanks and one flank becomes hotter than the other. The overmeasure or distribution of the overmeasure constitutes a specifically critical overheating factor.

By the above mentioned interrelations it is possible to figure a measure for the overheating risk and, when threshold values are given, the recognition of overheating while generating.

The speeds to be determined can be registered by inductive sensors or emitters of moment of momentum. Any other kind of speed control such as tachogenerators, sensors of angle of rotation, etc., can also be used. The motor current of the dividing apparatus can be measured by a shunt or bypass resistance in the control part of the electromotor that drives the dividing apparatus. The speed signals primarily undergo a sharp reduction when the grinding wheel enters in the tooth gap. Said reduction of speed can amount to 8 percent of the idling speed. The speed then reaches a stable value during the machining time in the gap. When exiting from the gap, the speed increases and thereafter reaches idle speed. Said speed course repeats itself during the machining of each tooth gap.

The recognition of overheating substantially depends here on the stable speed value within the gap. The kinds of overheating on the gap end or over the whole gap can thus be detected. The gradient of the rotation signal on the gap entrance has to be evaluated for the overheating situation on the gap entrance. The sharper the drop, the greater the overmeasure or the more asymmetrical the overmeasure distribution.

Another signal to be used for recognition of the overheating risk, especially in the machining of gears, is the motor current of the dividing apparatus. The motor current mentioned here is the motor current necessary to effect the turning of the axis of the dividing apparatus during the grinding of a helical gearing. The area within the tooth gap is evaluated. The motor current changes due to the differences of overmeasure between left and right tooth flanks, which the grinding wheel causes rotation along with or against the axis of the dividing apparatus. According to the asymmetry of the tooth flanks or also the asymmetrical wear of the grinding wheel, more or less current is needed to keep the correct grinding angle. The dividing apparatus, which acts as a workpiece support, serves at the same time as a means for receiving the initiated torque.

To avoid erroneous influences resulting from power fluctuations, the motor current of the driving spindle is used as an added parameter. If a drop in speed occurs due to power fluctuations, a change in performance is also considered with the aid of the motor current of the driving spindle. Without said added consideration, the conclusion would be reached, due to lower speed values, of a presumed high energy conversion and the feed would then be unnecessarily cut back.

The permanently evaluated parameters, motor current and speed, control the feed of the driving spindle inside the machine. Here the feed is always moved in such a manner that the determined and calculated values always show a converted energy below a preset threshold value. The feed can here be individually controlled so that the converted energy, with a certain safety margin, passes below the threshold value almost equidistantly thereto. If the converted energy now increases, the feed is cut back in accordance with said energy increase so that the threshold value is not exceeded. Thereby no overheating occurs in the machined workpiece and the workpiece can be further machined without limitation.

Although the machining time is prolonged due to the reduced feed, the workpiece does not have to be sorted out on account of overheating. Thus, the feed can, if needed, be reduced down to a presettable minimum value. But from experience it has also been found that grinding wheels soiled or affected by overheating have undergone, after a certain period of time, a self-cleaning by the machined workpieces. Therefore, grinding wheels that have once produced overheating or have been near to producing overheating can again become grinding wheels with absolutely normal working conditions. Accordingly, under a permanent supervision the feed of the driving spindle, after self-cleaning, can again be increased and again raised to the threshold value.

The knowledge gained about the overheating condition of the machined workpiece can be transposed in variations of different kinds. On one hand, a direct notice to the operator of the grinding machine can indicate that a workpiece has suffered overheating. Which workpiece has been affected can also be directly shown. For this purpose optical indicators can be provided, such as in the form of light diodes, scales with anisotropic indications, projection screens, or other similar means. For warning, acoustic indicators can also be advantageously provided which direct an operator to observe optical indicator means, for instance.

The indicator means could be designed, for instance, as follows:

Scales for each gear and one scale for the grinding state are provided on a display. Each scale carries maximum value indices which show to what extent has increased the overheating on a gear. This information is reset for each gear-carrier mandrel prior to starting the grinding and built up until termination of the grinding. At the end of the grinding the operator can see with reference to threshold values which wheels had overheating and which wheels do not. A measure for the state of the wheel can also be found by symmetry measurement aided by the motor current of the dividing apparatus and by the speed difference. This measure can also be indicated. The gears affected by overheating can be sorted out by the operator and remain excluded from the further machining process. Thus later complaints can be avoided, such as of gears with overheating having been fitted in transmissions. This avoids claim vexations, claim costs and added repair expenses. In addition to the delivery on a display, the data found and the resulting analysis made from said values are recorded in an internal memory. Said memory is preferably separately battery buffered so that even in case of a drop in the current of the processing machine, the certainty of the data remains. In the record are traced, for instance, datum, time and inspection results for each gear-carrier mandrel which can be called at any subsequent time.

A simplified indicator device, in the form of light diodes, can also be installed instead of a visual display. Here a green light diode could indicate "no overheating" and a red light diode "overheating."

In the aforementioned methods of indication, it is accepted that workpieces produced with overheating appear. These workpieces are then sorted out by the operator of the production machine and do not reach the further machining. But the generation of overheating should advantageously be completely avoided. For this purpose the measure for the overheating risk must be calculated. If in a given feed said risk is clearly below a critical threshold, then the feed can be increased. The critical threshold indicates the starting point from which the danger of overheating exists.

In a production machine the control system works as follows: First, a new mandrel loaded with gears is inserted in the production machine. The feed for said new mandrel is oriented following the adjusted feed of the last mandrel, but at first adjusted only to half of said value. A gap is then roughened out over all the mounted gears. In conformity with the values contained in the tooth gaps and calculated on the existing distance from the critical threshold value, the feed is increased or optionally taken back in order to move the production machine at the smallest possible distance below the critical threshold value. A short machining time of the individual workpieces results therefrom. The adaptation of the feed to higher or lower values is repeated from tooth gap to tooth gap and each time is calculated from the values found. With this control system one is oriented per mandrel as to the existing state of the grinding wheel. One moves here with moderate care to the threshold value that is critical and indicative of overheating and controls so as to take into consideration different distributions of overmeasure on the tooth flanks of a tooth gap. By virtue of the optimally high adjustment of the feed, which takes into consideration all actually existing parameters, the throughput of the machined workpieces can be clearly increased. At the same time, a 100 percent test of overheating takes place so that the machine does not produce waste of any kind. The material losses therefore are almost nil. The control system also takes into account the possibility of cleaning of the grinding wheels so that after the feed is taken back due to a soiled grinding wheel, the feed can again be increased after a self-cleaning of the wheel. The wheel remains in use, can continue to be used, does not have to be replaced and removed and can be further productively used. This aspect also leads to cost reduction without the workpiece being exposed to the danger of overheating.

The measurement of the current consumption of the dividing apparatus or of an equivalent signal from which conclusion can be drawn as to the torque initiated in the main mandrel carrier of workpieces leads to a measure for the asymmetry of the overmeasure distribution of both tooth flanks of a tooth gap.

The conversion of too much kinetic energy to thermal energy causes the overheating. Since the thermal energy introduced in a workpiece cannot at all be measured or measured only at great expense on the workpieces or the tools, an almost delay-free measurement of the momentarily present kinetic energy of the driving spindle is the adequate factor for judgment.

The kinetic energy of the driving spindle is composed of the rotation energy of the spindle motor and the driving spindle and of the electric power converted in the motor to kinetic energy at the actual moment.

The amount of unconverted kinetic energy in the tooth flanks is directly shown by the gradients of the speed drop. Therefore, the speed of the driving spindle must be measured and evaluated. For this purpose angular moments given by the driving spindle can be evaluated as a favorable method. For this purpose, a magnetic receiver, for instance, can be situated on the upper part of the spindle housing and measure the periodic revolution of the parts fastened on the spindle. Such parts could be screwcaps situated on the spindle. Rotation intervals can then be calculated therefrom.

Every change of friction in the tooth gap and therewith every change of power conversion impresses the momentary speed. The converted energy is distributed over both tooth flanks which are just being machined. How exact is the distribution at the given moment can be determined from the current of the dividing apparatus. As a component of the machine tool, the dividing apparatus swings the mandrel carrier of the workpieces while the grinding spindle moves therealong. Depending on the asymmetry of the overmeasure, the flanks of the gear are forced to favor or to check the rotation of the dividing apparatus. The drive of the main mandrel is forced to eliminate said favor or check and, to this end, exerts a braking or accelerating torque. The latter becomes apparent in the magnitude and the polarity of the power received by the dividing apparatus. The absorbed current of the dividing apparatus is thus a measure for the asymmetry of the introduction of energy in both flanks to be ground. Wire strain gauges on the bearing bracket of the dividing apparatus can offer accurate values of the braking or accelerating torque. They are not subject to control-bound hysteresis. This equally applies to the torque measuring shaft which can be situated between the dividing apparatus and the main mandrel. Said measuring shaft delivers a starting torque as measure for the asymmetry of the introduction of energy in the flanks to be ground.

The overheating risk substantially becomes apparent in two manners: on one hand, it appears in a slow manner wherein the active surface of the grinding wheel diminishes. As a consequence it follows that the interstices between the chips encased in the grinding wheel clog with the wear. This phenomenon occurs purely incidentally due to the distribution of the chips and can be triggered by overmeasure errors. But it is reversible when the wheel is given time to recover and clean itself. The cleaning operation needed for this is, for instance, a grinding operation with small feed. This takes place slowly, more than 20 tooth flanks as a rule being needed for the cleaning.

On the other hand, a quick manner proves to be relevant for overheating risk. Each tooth flank can unexpectedly offer an overmeasure error which causes a sharp braking of the driving spindle upon entrance of the grinding wheel in the tooth gap. For this case the change of rotational energy of the driving spindle is used as a parameter and compared with a known speed gradient to determine the overheating risk. If the speed especially decreases upon introduction in a tooth gap, this is an index of an incipient initial overheating at the beginning of the tooth gap. It mainly occurs in case of an extreme helical cut when the grinding wheel is severely worn out, the driving spindle and the tooth to be machined yield. The speed no more changes linearly but exponentially downward. The grinding operation begins with a delay. In this case also only the immediate reduction of the feed aids in avoiding overheating. The motor current of the driving spindle depends on the tooth size and on the gearing.

Overmeasure errors and wearing out of the wheel together represent a risk factor. By control of the velocity of the feed, this risk can be kept below a critical threshold starting from which the overheating occurs. The feed is no longer dependent on a compromise of tolerated probability of failure and economic limitation but on the momentary state of the grinding wheel and the gear.

In the case of good grinding performance, the driving spindle absorbs little energy while in the case of poor grinding performance it shows a high absorption of energy.

BRIEF DESCRIPTION OF THE DRAWINGS

The invention and the scope of use thereof are briefly shown with the aid of figures where.

DESCRIPTION OF THE PREFERRED EMBODIMENT

In the grinding of gears there has prevailingly been used a long grinding process with a single-profile grinding wheel. Unlike the grinding process with grinding wheels having an outline in which several profiles are situated next to each other on the grinding wheel, the single-profile grinding wheel has only the precise profile which the gear to be ground is to be produced at the moment between two teeth. The diagrammatic representation of such single-profile grinding wheel is to be understood from FIG. 1.

Figure 1A:
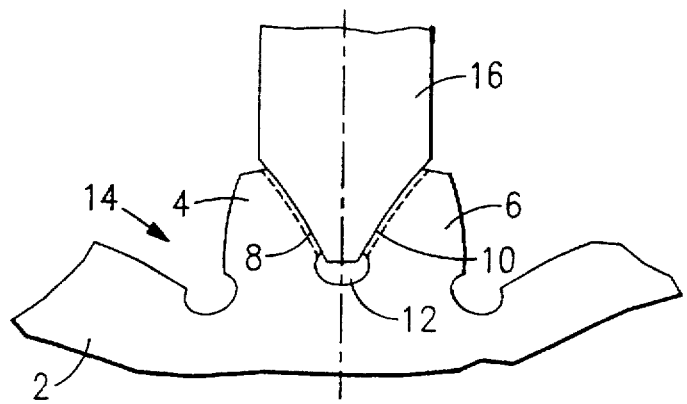
FIGS. 1A and 1B the diagrammatic representation of the grinding arrangement.

In FIG. 1A is shown a gear 2 of which only two teeth 4 and 6 are shown for the sake of clarity. For the explanations that follow is to be assumed that the tooth gap 14 formed by the tooth flanks 8 and 10 opposite each other and the tooth base 12 lying therebetween must be ground by means of a single-profile grinding wheel 16. The configuration of the external outline of said grinding wheel corresponds to the configuration of the internal outline of the tooth gap 14 to be ground.

Figure 1B:
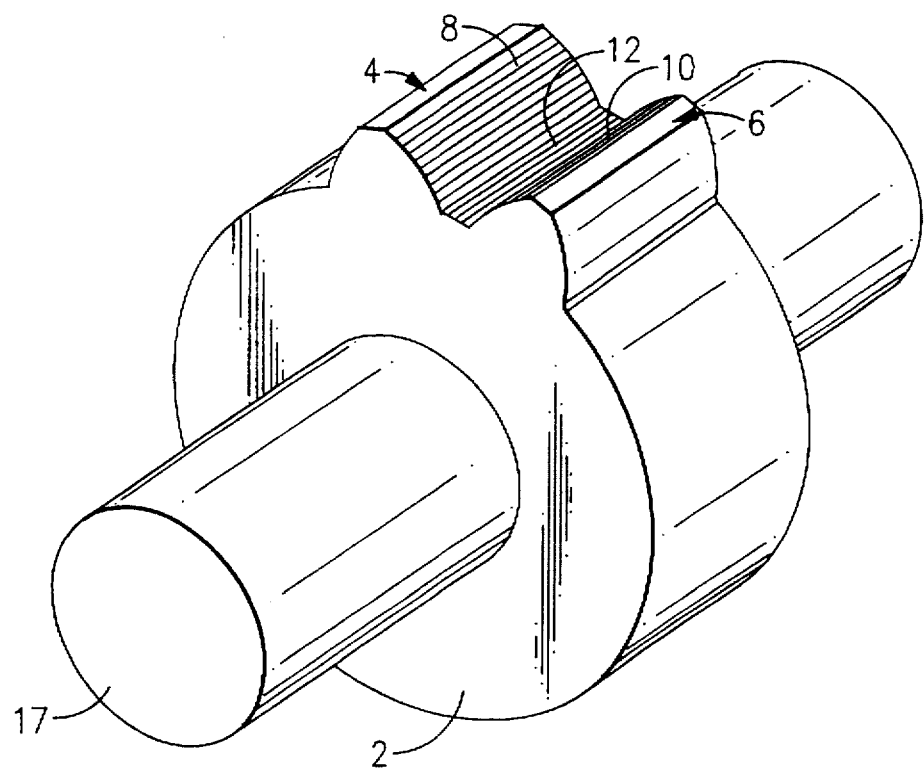
Figure 2:
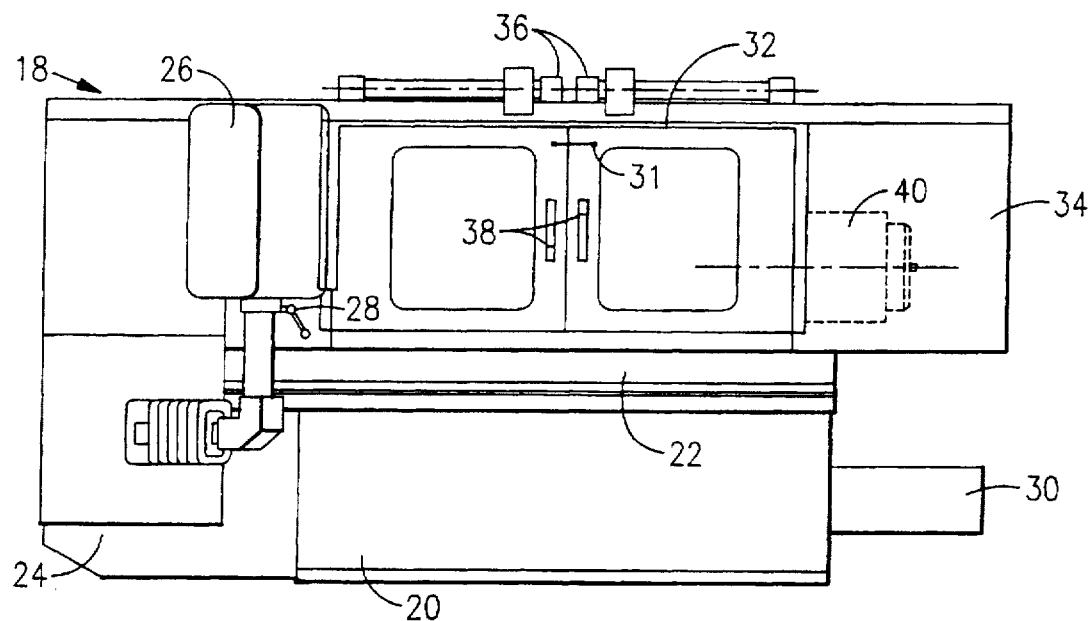
FIG. 2 is the front view of a grinding machine.

In FIG. 1B, a gear 2 is shown in perspective of which also only two teeth 4 and 6 are shown for clarity. The grinding surface subject to machining is shown hatched in FIG. 1B. During the grinding operation, the gear 2 is situated upon a support 17 (main mandrel) belonging to a grinding machine, as shown in FIG. 2. Due to the grinding of the grinding surface highlighted by hatching, temperature increases appear on said grinding surface, which can lead to thermal texture changes in the rim zone of the workpiece when said temperature increases exceed certain limiting values.

FIG. 2 shows a generally conventional grinding machine unit 18 which is used for grinding gears. A machine platen 22 is situated upon a bench 20. A switch cabinet console 24 carries a control panel 26 provided with a clamping lever 28 whereby the control panel 26 can be adjusted according to the individual requirements of the service personnel. Such a control panel 26 can contain the above proposed devices for showing the overheating so that the service personnel is always actually informed of the grinding state of the workpiece. A hydraulic lifting system 30 makes possible an adjustment of the machine platen 22. The service personnel has access to the otherwise encapsulated working space of the machine 18 through front sliding doors 31 belonging to the machine cover 34, the same as the doors for an automatic loading 32. The doors for the automatic loading 32 are activated by pneumatic cylinders 36 while the sliding doors 31 can be opened by control handles 38. In FIG. 2, the arrangement of the dividing apparatus 40 on the machine unit 18 is shown sketched. The dividing apparatus 40 projects into the working space of the machine and carries the workpieces to be machined or the main mandrel, not shown here, that carries the workpieces (gears) to be machined.

Figure 3:
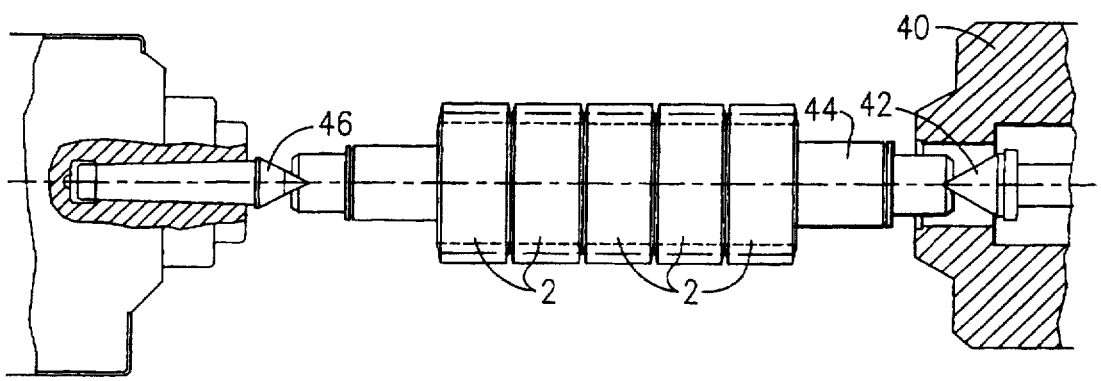
FIG. 3 is the mounting of the workpiece to be machined.

FIG. 3 shows an arrangement carrying the workpiece to be machined. The dividing apparatus 40 has a point 42 which meshes in a fixture of the main mandrel 44. On the opposite side the main mandrel 44 is supported by the tailstock point 46. The tailstock with the tailstock point 46 and the dividing apparatus 40 with the point 42 correspond to the designs known to the expert in this field. Several gears 2 are placed upon the main mandrel 44. Tailstock point 46 and dividing apparatus 42 have to be adapted and adjusted to the configuration of the workpieces to be machined. During the machining process, the main mandrel 44 is further rotated by the dividing apparatus around a respective tooth gap, it is not required that adjacent tooth gaps be also machined immediately one after the other. On the contrary, for reasons determined by the machine condition, tooth bases spaced farther apart can also be consecutively machined.

Figure 4:
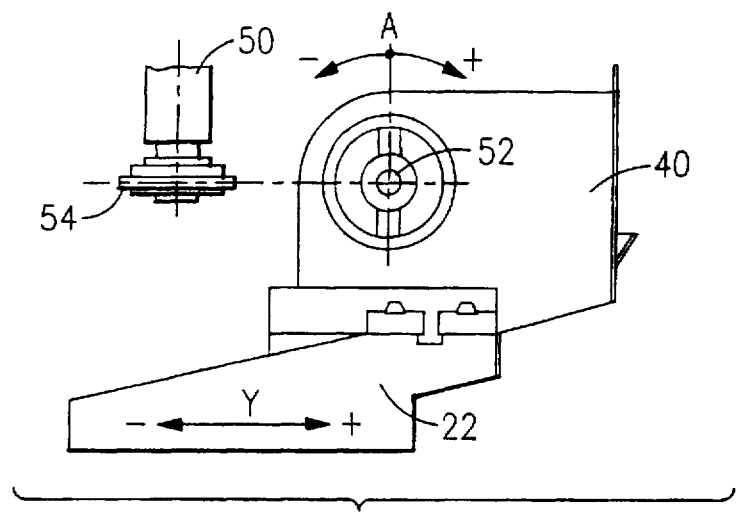
FIG. 4 is a side view of a dividing apparatus and grinding head arrangement of the grinding machine.
Figure 5:
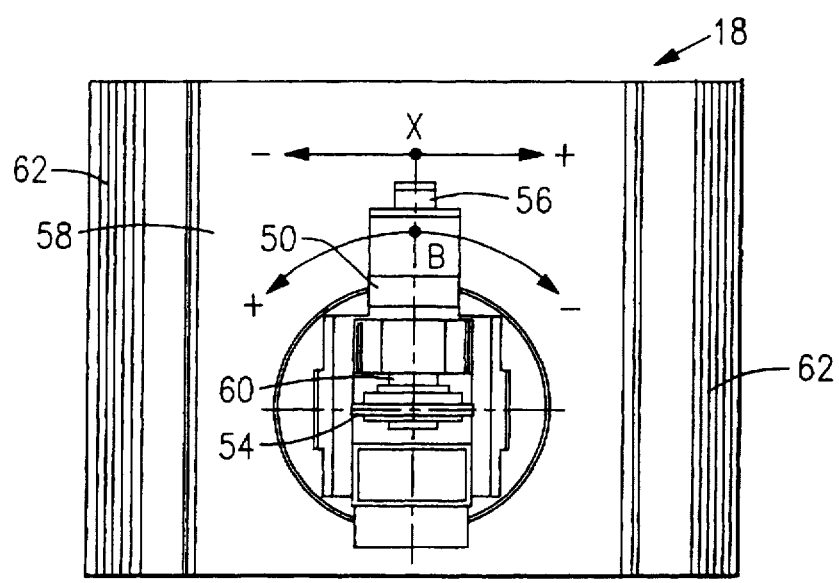
FIG. 5 is a front view of the grinding head.

FIG. 4 shows the possible adjustments of the dividing apparatus 40 while FIG. 5 shows the arrangement of the grinding head 50 and the possible adjustments thereof. FIG. 4 thus shows a side view of the dividing apparatus 40. The spindle 52 of the dividing apparatus can here effect rotational movement around an A axis, specifically by a certain angular value to the left (−) and to the right (+). The view shows the prospect on the spindle of the dividing apparatus in the (+X) direction according to FIG. 5. The machine platen 22, carrying the dividing apparatus 40, can be adjusted along the Y axis. Here a platen adjustment in (+) direction means a lifting of the grinding head 50 from the workpiece while an adjustment in (−) direction means a lowering of the grinding head 50 in the workpiece to the depth of grinding. The arrangement of the grinding head 50 with the grinding wheel 54 is only diagrammatically shown in FIG. 4 while FIG. 5 shows the grinding head 50 in a front view. The grinding head 50 can be vertically adjusted by a handle 56 and, at the same time, precisely adjusted with very fine graduation to the workpiece to be machined. Adjustments which move the grinding carriages 58 of the machine 18 or allow the grinding head 50 to swing are also possible. In the grinding operation, the displacement of the grinding carriage 58 in (+X) direction thus makes possible a grinding feed and the movement of the grinding carriage 58 in (−X) direction, a return stroke. A swinging of the grinding head 50 around the B axis produces in (+B) direction an adjustment of the grinding wheel 54 for workpieces having helical gearing with a pitch direction "rising to the right." A swinging of the grinding head 50 in (−B) direction produces an adjustment of the grinding wheel 54 for workpieces having helical gearing with a pitch direction "rising to the left." Workpieces where spur gearing or straight tooth gaps are ground parallel with the workpiece axis require an exactly vertical position of the grinding spindle 60 of the grinding head 50. The grinding wheel 54 has as external outline the profile of the internal outline of the tooth gap to be ground. In the long grinding with single-profile grinding wheels, the tooth gaps are consecutively ground. The grinding wheel here is inclined toward the axis of the workpiece according to the desired pitch. All pitches occurring can be ground.

The grinding head 50 is fastened to the grinding carriages 58 by adequate means not shown here. Rubber boots 62 are provided, on both sides of the grinding carriage 58 which, when the grinding carriage 58 is moved along the X axis, adapt to those movements.

The avoidance of overheating damage or the recognition of overheating in the individual workpieces makes it no longer needed to subject the workpieces to an etching bath analysis. Therefore, the ecologically encumbering etching bath process can be omitted.

The invention is not limited to the arrangements set forth here. It also covers all the modifications familiar to the expert in this field and which develop from the fundamental idea of the invention. The parameters needed for the process of the invention can be obtained from the essential parts of grinding machines shown either by the ways proposed or by the steps familiar to the expert without a precise illustration in the drawing being required for that. The expert will arrange on the machine device components of the data registration so as to obtain, taking into account the expected and above shown stresses, plausible parameters which he will apply according to the process of the invention.

REFERENCE NUMERALS 2 gear
4 gear
6 gear
8 tooth flank
10 tooth flank
12 tooth base
14 tooth gap
16 grinding wheel
17 support
18 grinding machine unit
20 machine bench
22 machine platen
24 switch cabinet console
26 control panel
28 clamping lever
29 hydraulic system for lifting motions
31 sliding door
32 door for automatic loading
34 machine cover
36 pneumatic cylinder
38 control handle
40 dividing apparatus
42 dividing apparatus point
44 main mandrel
46 tailstock point 50 grinding head
52 dividing apparatus spindle
54 grinding wheel
56 handle for vertical adjustment
58 grinding carriages
60 grinding spindle
63 rubber boots

We claim:

1. A process for avoiding thermal overstressing of a workpiece during grinding by a grinding arrangement having a grinding spindle and a driving machine, said process comprising the steps of:

measuring at least a rotational speed of the grinding spindle during use;

supplying said measured rotational speed of the grinding spindle to a data processing device;

determining a measurement of the kinetic energy of said grinding spindle from said measured rotational speed;

comparing said determined measurement of the kinetic energy with a kenetic energy reference value which is characteristic of overheating of said workpiece;

adjusting at least one of said rotational speed and a grinding feed rate of said workpiece to maintain said determined kinetic energy below said kenetic energy reference value to prevent overheating of said workpiece; and determining oscillations of a power-supply voltage of said grinding spindle and controlling said process based upon oscillations in the speed of said grinding spindle.

2. A process for avoiding thermal overstressing of a workpiece during grinding according to claim 1, further comprising the step of providing a warning device to indicate when said workpiece has suffered overheating.

3. A process for avoiding thermal overstressing of a workpiece during grinding according to claim 1, further comprising the step of providing an optical warning device to indicate when said workpiece has suffered overheating.

4. A process for avoiding thermal overstressing of a workpiece during grinding according to claim 1, further comprising the step of providing an acoustic warning device to indicate when said workpiece has suffered overheating.

5. A process for avoiding thermal overstressing of a workpiece during grinding according to claim 1, further comprising the step of providing a combined optical-acoustic device to indicate when said workpiece has suffered overheating.

6. A process for avoiding thermal overstressing of a workpiece during grinding according to claim 1, further comprising the step of adjusting a grinding feed rate of said grinding spindle according to the determined kinetic energy.

7. A process for avoiding thermal overstressing of a workpiece during grinding according to claim 1, further comprising the step of stopping the feed of said workpiece once said kenetic energy reference value is exceeded.

8. A process for avoiding thermal overstressing of a workpiece during grinding according to claim 1, further comprising the step of controlling the grinding feed rate of said workpiece so as to be below said kenetic energy reference value.

9. A process for avoiding thermal overstressing of a workpiece during grinding according to claim 1, further comprising the step of, during grinding of gears, determining a torsional torque of a dividing apparatus of said grinding device, supplying the determined rotational torque value to the data processing device, deriving therefrom a measurement for an asymmetry of wear of the sides of said grinding wheel, and taking said measurement for the asymmetry of wear of the sides of said grinding wheel into consideration when controlling the grinding feed rate of said workpiece.

10. A grinding device for carrying out the process according to claim 1, wherein a driving machine with a grinding spindle is provided, an apparatus for measuring the speed of said grinding spindle and a data processing device is provided, and said data processing device and said speed-measuring apparatus are interconnected with one another for signal communication.

11. A process for avoiding thermal overstressing of a workpiece during grinding by a grinding arrangement having a grinding spindle and a driving machine, said process comprising the steps of during use:

measuring at least a rotational speed of the grinding spindle of the grinding spindle;

supplying said measured rotational speed to a data processing device;

determining a measurement of the kinetic energy of said grinding spindle from said measured rotational speed;

comparing said determined measurement of the kinetic energy with a kinetic energy reference value which is characteristic of overheating of said workpiece;

adjusting at least one of said rotational speed and a grinding feed rate of said workpiece to maintain said determined kinetic energy below said kinetic energy reference value to prevent overheating of said workpiece; and, during grinding of a gear, determining a rotational torque of a dividing apparatus of said grinding device, supplying the determined rotational torque value to the data processing device, determining therefrom a measurement for an asymmetry of an overmeasure distribution of a tooth gap, and controlling the grinding feed rate at least partially based upon said determined measure for the asymmetry of overmeasure distribution.

12. A process for avoiding thermal overstressing of a workpiece during grinding according to claim 11, further comprising the step of determining a torsional torque by a motor current needed by the dividing apparatus for rotating with or against the grinding wheel penetrating in a tooth gap.

13. A process for avoiding thermal overstressing of a workpiece during the grinding according to claim 11, further comprising the step of determining a torsional torque by flexural torques introduced in said dividing apparatus.

14. A process for avoiding thermal overstressing of a workpiece during grinding according to claim 13, further comprising the step of measuring said flexural torques via wire strain gauges.

15. A process for avoiding thermal overstressing of a workpiece during grinding according to claim 11, further comprising the step of measuring said torsional torque, via a torque-measuring shaft situated between said dividing apparatus and a main mandrel, as a twisting torque.

16. A grinding device for carrying out the process according to claim 11, wherein a driving machine with a grinding spindle is provided, an apparatus for measuring the speed of said grinding spindle is provided, a workpiece support with device for measuring the torque introduced in the workpiece and a data processing device is provided, and said data processing device, said speed-measuring apparatus and said apparatus for measuring the torque are interconnected with one another for signal communication.

* * * * *